US009923467B2

(12) United States Patent
Lee et al.

(10) Patent No.: US 9,923,467 B2
(45) Date of Patent: Mar. 20, 2018

(54) MULTIPHASE CONVERTING CONTROLLER

(71) Applicant: GREEN SOLUTION TECHNOLOGY CO., LTD., New Taipei (TW)

(72) Inventors: Li-Min Lee, New Taipei (TW); Quan Gan, New Taipei (TW); Shian-Sung Shiu, New Taipei (TW)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 639 days.

(21) Appl. No.: 13/854,968

(22) Filed: Apr. 2, 2013

(65) Prior Publication Data

US 2014/0292291 A1    Oct. 2, 2014

(51) Int. Cl.
*H02M 3/158*    (2006.01)
*H02M 1/00*    (2006.01)

(52) U.S. Cl.
CPC .. *H02M 3/1584* (2013.01); *H02M 2001/0032* (2013.01); *H02M 2003/1586* (2013.01); *Y02B 70/16* (2013.01)

(58) Field of Classification Search
CPC .... H02M 3/156; H02M 3/158; H02M 3/1584; H02M 3/285; H02M 7/08; H02M 7/23;
(Continued)

(56) References Cited

U.S. PATENT DOCUMENTS

2003/0201760 A1* 10/2003 Umemoto ............. H02M 3/156
                                                          323/271
2005/0237040 A1    10/2005 Rice
(Continued)

FOREIGN PATENT DOCUMENTS

CN    1992487       7/2007
CN    101308390     11/2008
(Continued)

OTHER PUBLICATIONS

"Office Action of China Counterpart Application", dated Dec. 4, 2015, p. 1-p. 6.
(Continued)

*Primary Examiner* — Timothy J Dole
*Assistant Examiner* — Ivan Laboy Andino
(74) *Attorney, Agent, or Firm* — JCIPRNET

(57) ABSTRACT

A multiphase converting controller, adapted to control a plural converting circuits coupled to an input voltage to commonly supply an output voltage, is disclosed. The multiphase converting controller comprises a feedback control circuit, an on-time control circuit, and a multiphase logic control circuit. The feedback control circuit determines a conduction starting point in time according to the output voltage and accordingly generates a conduction signal. The on-time control circuit determines a conduction time period. The multiphase logic control circuit controls the plural converting circuit in sequence in accordance to the conduction signal and the conduction time period. The on-time control circuit adjusts a length of the conduction time period according to a mode signal.

10 Claims, 3 Drawing Sheets

(58) Field of Classification Search
CPC ... H02M 2001/007; H02M 2001/0032; H02M 2003/1586; H02M 2001/1586; Y02B 70/16
USPC ....... 323/222, 225, 271, 272, 282–285, 351; 363/65
See application file for complete search history.

(56) References Cited

U.S. PATENT DOCUMENTS

| | | | |
|---|---|---|---|
| 2006/0164050 A1 | 7/2006 | Hasegawa et al. | |
| 2008/0030181 A1* | 2/2008 | Liu | H02M 3/157 323/283 |
| 2008/0238392 A1 | 10/2008 | Cheung et al. | |
| 2009/0167271 A1 | 7/2009 | Tang et al. | |
| 2010/0033154 A1* | 2/2010 | Cheng | H02M 3/1584 323/293 |
| 2010/0123440 A1* | 5/2010 | Bandholz | H02M 3/1584 323/272 |
| 2011/0254531 A1* | 10/2011 | Markowski | H02J 1/102 323/371 |
| 2013/0038312 A1* | 2/2013 | Wang | H02M 3/1584 323/288 |
| 2013/0169249 A1* | 7/2013 | Lee | H02M 3/1584 323/272 |

FOREIGN PATENT DOCUMENTS

| | | |
|---|---|---|
| CN | 102931841 | 2/2013 |
| JP | 2006340442 | 12/2006 |
| TW | 201008122 | 2/2010 |
| TW | 201034356 | 9/2010 |
| TW | 201131955 | 9/2011 |

OTHER PUBLICATIONS

"Office Action of Taiwan Counterpart Application", dated Nov. 11, 2014, p. 1-p. 4.
"Office Action of China Counterpart Application", dated Jul. 25, 2016, p. 1-p. 6.
"Office Action of China Counterpart Application," dated Dec. 29, 2016, p. 1-p. 6.

* cited by examiner

MULTIPHASE CONVERTING CONTROLLER

BACKGROUND OF THE INVENTION (1) Field of the Invention

The present invention relates to a multiphase converting controller, and more particularly relates to a multiphase converting controller that adjusts a length of the conduction time period according to a mode signal.

(2) Description of the Prior Art

FIG. 1 is a schematic diagram of a conventional multiphase converting controller. Herein, take two phases (converting circuits) for example. Converting circuits 2 and 4 are coupled to an input voltage Vin and separately comprises high-side transistors MU1 and MU2, low-side transistors ML1 and ML2 and inductances L1 and L2. Output ends of the converting circuits 2 and 4 are coupled to an output capacitance C to commonly supply an output voltage Vout. A multiphase converting controller 10 controls the converting circuits 2 and 4 in sequence. The system provides a mode signal Sm for notice when entering into a light load state, and the multiphase converting controller 10 executes the phase reducing operation when receiving the mode signal Sm. The conventional controller always keeps the first phase work and sheds the second phase, i.e., the converting circuit 2 continues operating and the converting circuit 4 stops operating. Thus, it can reduce the switch loss to raise the efficiency in light load.

The conventional controller always keeps certain phase (such as the first phase) operate. It causes the workloads of the power transistors and the inductances of the phases to unbalance. The certain phase will damage earlier than other phases, and so the life-span of the whole circuit is shortened.

FIG. 2 is a schematic diagram of a control circuit of a power supply circuit disclosed in the TW patent publication No. 201034356 applied by RICHTEK Technology Corporation. An error amplifier EA compares a feedback signal FB with an output voltage reference signal Vref and then generates an error amplification signal. The error amplification signal is inputted to pulse width modulating comparators PWM1 and PWM2 corresponding to different phases. Operation amplifiers OP1 and OP2 compare voltage signals ISEN1, ISEN1_N, ISEN2 and ISEN2_N at two ends of phase current detecting resistors, and accordingly measure phase currents and generate corresponding current amplification signals. The current amplification signals are input into corresponding pulse width modulating comparators PWM1 and PWM2. The gate control circuit 14 generates driving signals UG1, LG1, UG2 and LG2 to drive the corresponding power transistors.

An external phase control signal PSC determines whether executing the phase reducing operation. When a phase selecting circuit 16 receives the external phase control signal PSC, the control circuit is triggered to determine whether entering to the phase reducing operation. When determining that the phase reducing operation is necessary, the control circuit controls the gate control circuit 14 to turn off one or more phases. The pause phase(s) is not fixed during the phase reducing operation.

The Richtek uses the phase selecting control to change the pause phase with different phase reducing operations for balancing the workload of the phases. Actually, every time the circuit is restarted, the control circuit will execute the phase reduction operation to pause phase from a default first phase. Therefore, the workloads of the power transistors and the inductances among the phases are still obviously unbalanced.

In other words, to execute the phase reducing in the prior art can not balance the workloads of the power transistors and the inductances. Consequently, the phase having the heavier workload will damage earlier than other phases having the lighter workload, and so the life-span of the whole circuit is shortened.

SUMMARY OF THE INVENTION

The conventional multiphase converting controller has the unbalancing problem among the phases when executing the phase reducing operation, and so the life-span of the circuit is shortened. In contrast, the present invention does not execute the phase reducing operation under the light load state to ensure the workloads of the phases balancing. The present invention extends the conduction time period of the phases under the light load to make an operating frequency of the system frequency be reduced to reach the equivalent effect of the phase reduction operation for increasing efficiency.

To accomplish the aforementioned and other objects, a multiphase converting controller of the present invention, adapted to control a plural converting circuit coupled to an input voltage to commonly supply an output voltage. The multiphase converting controller comprises a feedback control circuit, an on-time control circuit and a multiphase logic control circuit. The feedback control circuit decides a conduction starting point in time according to the output voltage and accordingly generates a conduction signal. The on-time control circuit decides a conduction time period. The multiphase logic control circuit controls the plural converting circuit conduction in sequence according to the conduction signal and the conduction time period. Wherein, the on-time control circuit adjusts the length of the conduction time period according to a mode signal.

The present invention also provides a multiphase converting controller, adapted to control a plural converting circuit coupled to an input voltage to commonly supply an output voltage. The multiphase converting controller comprises a clock generator, a feedback control circuit and a multiphase logic control circuit. The clock generator generates a clock signal and a ramp signal according to an operating frequency. The feedback control circuit generates a conduction signal according to the output voltage and the ramp signal. The multiphase logic control circuit controls a plural converting circuit in sequence according to the conduction signal and the clock signal. Wherein, the clock generator adjusts frequencies of the clock signal and the ramp signal according to a mode signal.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
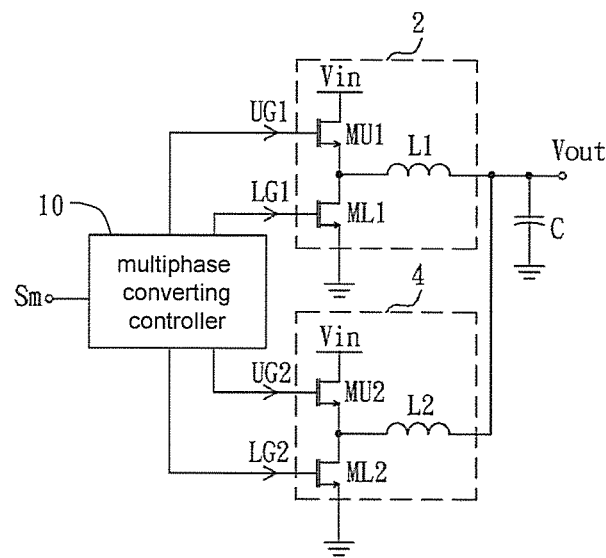
FIG. 1 is a schematic diagram of a conventional multiphase converting controller.
Figure 2:
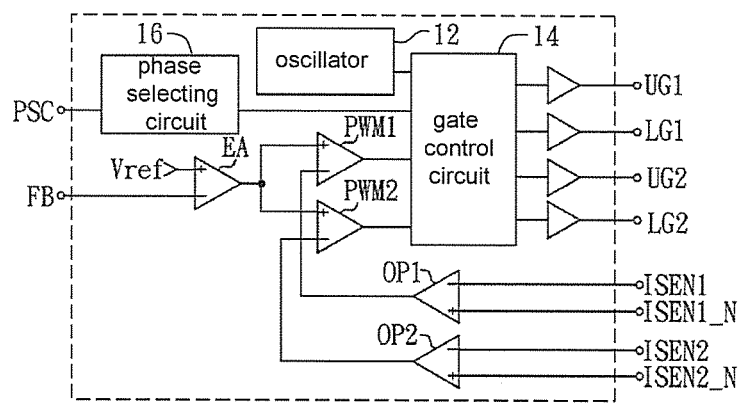
FIG. 2 is a schematic diagram of a control circuit of a power supply circuit disclosed in the TW patent publication No. 201034356 of RICHTEK Technology Corporation.
Figure 3:
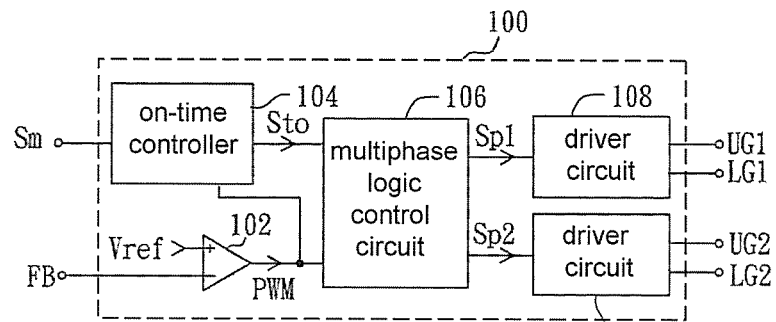
FIG. 3 is a schematic diagram of a multiphase converting controller according to a first preferred embodiment of the present invention.

FIG. 3 is a schematic diagram of a multiphase converting controller according to a first preferred embodiment of the present invention. The multiphase converting controller 100, adapted to control a plural converting circuit coupled to an input voltage (please referring to FIG. 1) to commonly supply an output voltage. The present embodiment takes two converting circuits as an example to describe. The multiphase converting controller 100 comprises a feedback control circuit, an on-time controller 104 and a multiphase logic control circuit 106. The feedback control circuit comprises a comparator 102, a non-inverting terminal of the comparator 102 receives an input voltage reference signal Vref and an inverting terminal thereof receives a feedback signal FB indicative of the output voltage. The comparator 102 generates a conduction signal PWM when a level of the feedback signal FB is lower than a level of the output voltage reference signal Vref. The on-time controller 104 starts time counting when receiving the conduction signal PWM, and then generates an on-time signal Sto when the time reaches a predetermined conduction time period. Thus, the time interval between the time points of generating the conduction signal PWM and the on-time signal Sto represents the length of a conduction time period of the converting circuit. The multiphase logic control circuit 106 controls a plural converting circuit to conduct in sequence according to the conduction signal PWM and the number of cycle represented by the on-time signal Sto. For example, the multiphase converting logic control circuit 106 counts a number of times of the conduction signal PWM and turns on a high-side transistor of the corresponding converting circuit among the plural converting circuit according to the number of counted times.

The multiphase logic control circuit 106 generates a corresponding one of phase control signals Sp1 and Sp2 when receiving the conduction signal PWM. The corresponding one of driver circuits 108 and 110 generate driving signal UG1 or UG2 to correspondingly conduct the high-side transistor of the corresponding converting circuit. The multiphase logic control circuit 106 ends the conduction time period of the corresponding converting circuit when receiving the on-time signal Sto to stop the high-side transistor of the corresponding converting circuit. Then, the corresponding one of the driver circuits 108 and 110 generates driving signal LG1 or LG2 for correspondingly conducting the low-side transistor of the corresponding converting circuit. The driving signals LG1 and LG2 are generated for continuing currents of inductances to flow there through. Therefore, the generation and pulse widths of driving signals LG1 and LG2 are determined according to continuous current mode (CCM), the discontinuous current mode (DCM), detected result for inductive current and diode emulation mode (DEM). The multiphase logic control circuit 106 conducts next converting circuit when the level of the feedback signal FB is lower than the level of the output voltage reference signal Vref again. Thus, the conduction time period of the plural converting circuit of the present embodiment is staggered with each other.

The on-time control circuit 104 additionally receives a mode signal Sm. The mode signal Sm may be generated from a load circuit. For example, the mode signal Sm is a digital control signal generated by the microcontroller or the microprocessor in the load circuit or an analog signal indicative of a load current. When the mode signal Sm represents a light load state, the on-time control circuit 104 delays a generation timing of the on-time signal Sto, i.e., the time interval between the time points of generating the conduction signal PWM and the on-time signal Sto is extended. Thus, the conduction time period of the high-side transistor in the plural converting circuit is extended to raise the energy every time transmitted by every converting circuit to the load. The time point when the level of the feedback signal FB is lower than the level of the output voltage reference signal Vref is delayed. Hence, the present invention reaches the effect of reducing the operating frequency and then reduces the switch loss to raise the efficiency under the light load. Furthermore, the multiphase logic control circuit 106 still controls in sequence the plural converting circuit to conduct and does not execute the phase reducing operation for avoiding the problems of unbalancing workloads among the phases in the prior art.

Figure 4:
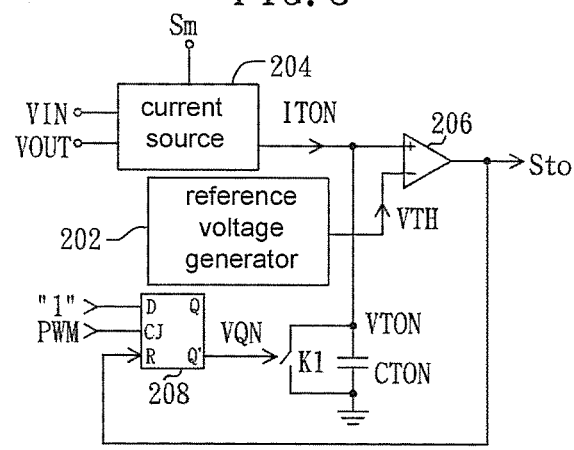
FIG. 4 is a schematic diagram of an on-time controller according to a first preferred embodiment of the present invention.

FIG. 4 is a schematic diagram of an on-time controller according to a first preferred embodiment of the present invention. The on-time control circuit mainly comprises a reference voltage generator 202, a current source 204, a comparator 206 and an on-time capacitance CTON. The current source 204 generates a current ITON to charge the on-time capacitance CTON for generating a capacitance voltage VTON. The reference voltage generator 202 generates an on-time reference voltage VTH. The comparator 206 compares the capacitance voltage VTON with the on-time reference voltage VTH for generating an on-time signal Sto. The on-time control circuit may additionally comprise a D type flip-flop 208 and a reset switch K1 for resetting the capacitance voltage VTON of the on-time capacitance CTON to be zero voltage for the next phase. The D type flip-flop 208 receives the conduction signal PWM at a clock input terminal CJ. At this time, the D type flip-flop 208 outputs a switch signal VQN with a low level at an inverting terminal Q' for cutting off the reset switch K1 due to that an input terminal D receives a logic signal "1". The current source 204 starts to charge the on-time capacitance CTON to raise the on-time reference voltage VTH. At the beginning of charging on-time capacitance CTON, the capacitance voltage VTON is lower than the on-time reference voltage VTH. After the predetermined conduction time period, the capacitance voltage VTON is higher than the on-time reference voltage VTH and the comparator 206 outputs the on-time signal Sto. When receiving the on-time signal Sto at a reset terminal R, the D type flip-flop 208 outputs a low level signal at an output terminal Q and outputs a high level of the switch signal VON at the inverting terminal Q' for conducting the reset switch K1. At this time, the capacitance voltage VTON returns to zero to wait for next cycle, i.e., the conduction signal PWM again returns to the high level.

The current source 204 decides the amount of the current ITON for charging the on-time capacitance CTON according to an input voltage Vin coupled to a plural converting circuit or/and an output voltage Vout commonly provided by the plural converting circuit. Namely, a default conduction time period of the plural converting circuit is determined. The current source 204 also additionally receives the mode signal Sm and reduces the amount of the current ITON for extending the conduction time period of the converting circuit when the mode signal Sm represents the light load state. For example, the conduction time period becomes N times of itself when the current ITON is dropped to be 1/N times of itself, and its effect is equal to that (N−1) phases is removed.

Figure 5:
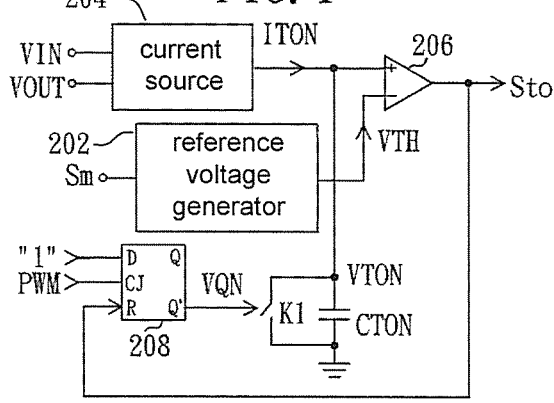
FIG. 5 is a schematic diagram of an on-time controller according to a second preferred embodiment of the present invention.

FIG. 5 is a schematic diagram of an on-time controller according to a second preferred embodiment of the present invention. Compared with the embodiment as shown in FIG. 4, the reference voltage generator 202 executes modulation in response to the mode signal Sm. When the mode signal Sm represents the light load state, the reference voltage generator 202 raises the voltage level of the on-time reference voltage VTH to extend the conduction time period of the converting circuit. The operation description of other circuit is referred to the corresponding circuit as shown in FIG. 4.

Figure 6:
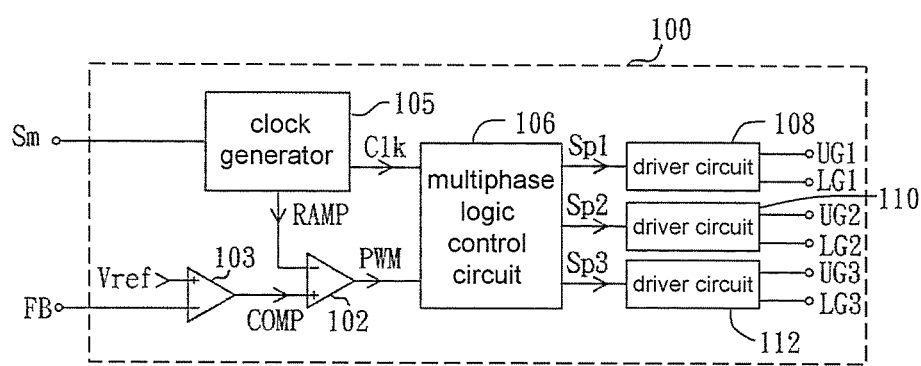
FIG. 6 is a schematic diagram of a multiphase converting controller according to a second preferred embodiment of the present invention.

FIG. 6 is a schematic diagram of a multiphase converting controller according to a second preferred embodiment of the present invention. The multiphase converting controller 100, adapted to control a plural converting circuit coupled to an input voltage to commonly supply an output voltage. In the present embodiment, take three converting circuits as an example to describe. The multiphase converting controller 100 generates phase control signals Sp1, Sp2 and Sp3 and generates driving signals UG1, LG1, UG2, LG2, UG3 and LG3 through driver circuits 108, 110 and 112 to control the corresponding high-side transistors and the corresponding low-side transistors in the converting circuits. The multiphase converting controller of the embodiment is a fixed frequency architecture. The multiphase converting controller 100 comprises a feedback control circuit, a clock generator 105 and a multiphase logic control circuit 106. The feedback control circuit comprises a comparator 102 and an error amplifier 103. A non-inverting terminal of the error amplifier 103 receives an output voltage reference signal Vref, and an inverting terminal thereof receives a feedback signal FB indicative of the output voltage. Accordingly, the error amplifier 103 generates an error amplification signal COMP. The clock generator 105 generates a clock signal Clk and a ramp signal RAMP according to a predetermined operating frequency, and so the frequency of the clock signal Clk and the ramp signal RAMP are the same. A non-inverting terminal of the comparator 102 receives the error amplification signal COMP, an inverting terminal thereof receives the ramp signal RAMP and accordingly the comparator 102 generates a conduction signal PWM. The multiphase logic control circuit 106 controls a plural converting circuit to conduct in sequence according to the conduction signal PWM and the clock signal Clk.

The clock generator 105 receives a mode signal Sm and reduce the frequency of the clock signal Clk and the ramp signal RAMP when the mode signal Sm represents a light load state. When the frequency is dropped to 1/N times, the embodiment namely achieves the purpose of removing (N−1) phases.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A multiphase converting controller, adapted to control a plural converting circuit coupled to an input voltage to commonly supply an output voltage to a load circuit, comprising:
   a feedback control circuit, deciding a conduction starting point in time according to the output voltage and accordingly generating a conduction signal;
   only one on-time control circuit, deciding a conduction time period; and
   a multiphase logic control circuit, counting a number of times of the conduction signal, and controlling the plural converting circuit in sequence according to the number of times of the conduction signal and the conduction time period;
   wherein, the on-time control circuit adjusts a length of the conduction time period according to a mode signal when the mode signal represents a light load state, and the mode signal is generated by the load circuit to represent a load state of the load circuit,
   wherein each of the plural converting circuit has a high side transistor coupled to the input voltage, the multiphase logic control circuit turns on the high side transistor of each converting circuit in sequence according to the number of times of the conduction signal and the conduction time period to supply the output voltage, and an on-time of the high-side transistors is staggered with each other,
   wherein the multiphase logic control circuit still controls in sequence the plural converting circuit to conduct and does not execute a phase reducing operation on the plural converting circuit under the light load state.

2. The multiphase converting controller according to claim 1, wherein the on-time control circuit adjusts the length of the conduction time period of the plural converting circuit according to the input voltage.

3. The multiphase converting controller according to claim 1, wherein the on-time control circuit extends the length of the conduction time period when the mode signal represents the light load state.

4. The multiphase converting controller according to claim 1, wherein the on-time control circuit adjusts the length of the conduction time period of the plural converting circuit according to the input voltage.

5. The multiphase converting controller according to claim 1, wherein the on-time control circuit comprises a comparator, a current source, an on-time capacitance and a reference voltage generator, the current source charges the on-time capacitance for generating a capacitance voltage, and the reference voltage generator generates an on-time reference voltage, and the comparator compares the capacitance voltage and the on-time reference voltage for generating a conduction period signal.

6. The multiphase converting controller according to claim 5, wherein the current source adjusts a current for charging the on-time capacitance according to the mode signal.

7. The multiphase converting controller according to claim 5, wherein the reference voltage generator adjusts a level of the on-time reference voltage according to the mode signal.

8. The multiphase converting controller according to claim 1, wherein the on-time control circuit comprises a comparator, a current source, an on-time capacitance and a reference voltage generator, the current source charges the on-time capacitance for generating a capacitance voltage, and the reference voltage generator generates an on-time reference voltage, and the comparator compares the capacitance voltage and the on-time reference voltage for generating a conduction period signal.

9. The multiphase converting controller according to claim 8, wherein the current source adjusts a current for charging to the on-time capacitance according to the mode signal.

10. The multiphase converting controller according to claim 8, wherein the reference voltage generator adjusts a level of the on-time reference voltage according to the mode signal.

\* \* \* \* \*